Patented Dec. 22, 1953

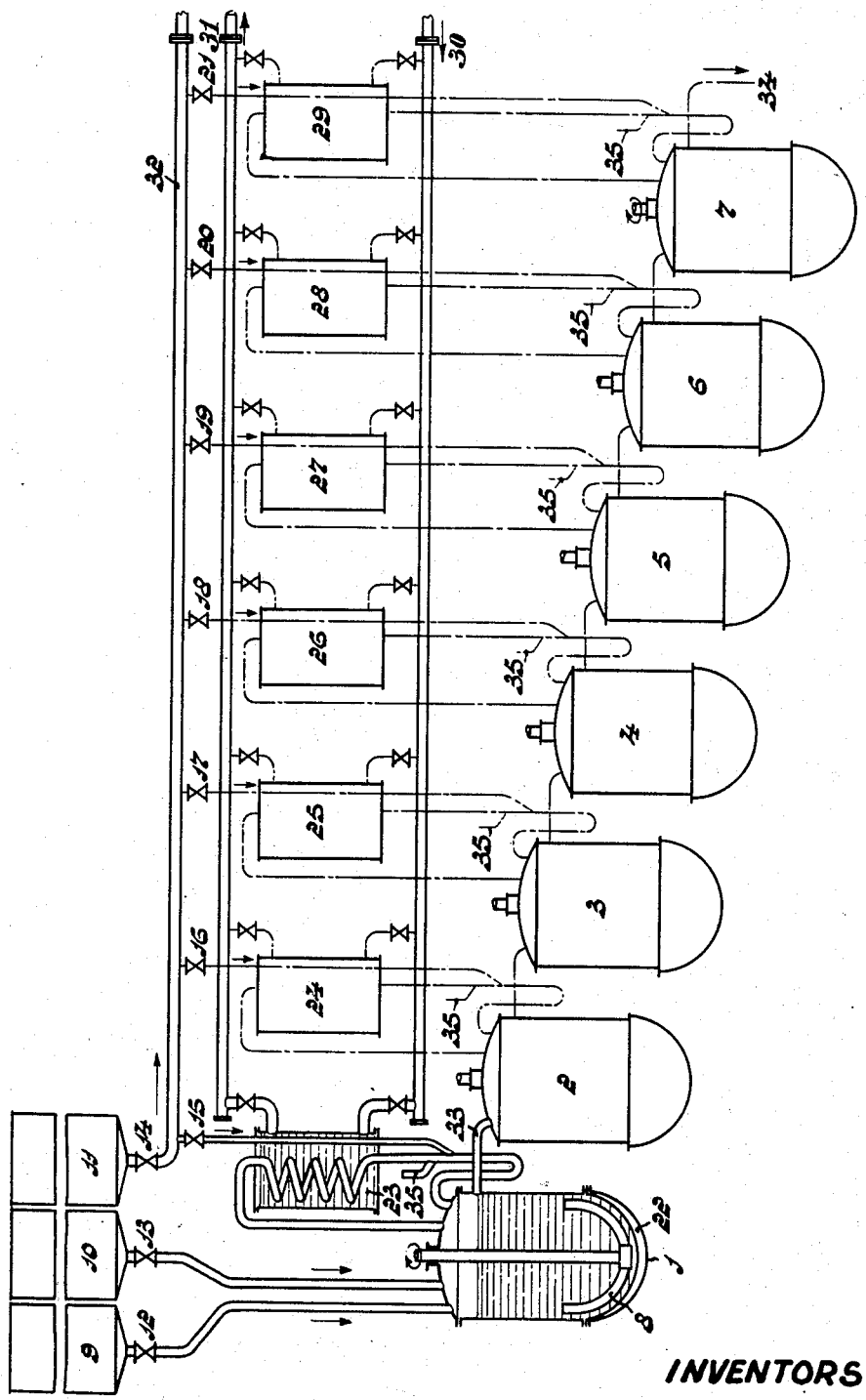

2,663,699

UNITED STATES PATENT OFFICE 2,663,699

CONTINUOUS METHOD OF PREPARING NOVOLAKS AND DEVICES SUITABLE FOR SUCH METHODS

Herman Bloem and Marinus Stel, Eindhoven, Netherlands, assignors to Hartford National Bank and Trust Company, Hartford, Conn., as trustee Application March 4, 1950, Serial No. 147,624

9 Claims. (Cl. 260—54)

This invention relates to methods of preparing novolaks from a phenol and a formaldehyde using a catalyst in which the reaction components are continuously supplied to a reaction apparatus and the desired final condensation product is continuously carried off therefrom. Phenols which are suitable are monohydroxybenzene and homologues thereof, such as cresol and xylenol suitable for the purpose, and polyhydric phenols such as resorcinol. As is well-known, novolaks are phenolformaldehyde condensation products which are not capable of solidifying in themselves.

The object of the invention is to ensure that gelatinisation cannot occur in such a continuous preparation since otherwise the reaction mixtures becomes insufficiently liquid to be vigorously mixed and to traverse the reaction apparatus. If gelatinisation occurs, this is probably attributable to an unduly high concentration of too high molecular condensation products which may be formed in the reaction mixture in proportion to the possibility of the formaldehyde reacting with condensation products already having a fairly high molecular weight instead of with unaffected phenol or with condensation products having a small molecular weight. This possibility is not great in the usual discontinuous method of preparation and gelatinisation need not occur in the case of thorough mixing in the reaction vessel.

The invention is directed to a method of preparing novolaks from phenol and formaldehyde using a catalyst, all of which are supplied continuously, the desired final condensation product being drawn off continuously, in which the phenol and the catalyst are supplied to the first of a plurality of series-connected reaction chambers and the required amount of formaldehyde is distributed over the several reaction chambers simultaneously, the reaction mixture traversing the reaction chambers in succession without gelatinisation of the reaction mixture occurring during the traverse of the several reaction chambers by the reaction mixture.

The invention is preferably carried out in such manner that a stationary reaction condition prevails in each reaction chamber to which formaldehyde is supplied. Such stationary reaction conditions occur some time after the initiation of a reaction if the said continuous supply and discharge invariably take place evenly at constant conditions of reaction. Furthermore, it is preferable that the course of the reaction conditions should be divided fully or substantially uniformly over the reaction chambers to which the portions of the required formaldehyde are supplied simultaneously. This is not strictly necessary but the division of supply and reaction of the formaldehyde over the reaction vessels must not be so irregular that gelatinisation would still occur.

In order to explain the invention more fully, it is observed that if phenol, formaldehyde and a catalyst for the preparation of novolak are continuously supplied and brought together in one reaction chamber, there is a great possibility that the continuously supplied formaldehyde may unduly react with condensation products already formed, with the described consequence of unduly high concentration of too high molecular condensation products. Indeed, in such a case there is a considerable risk that gelatinisation occurs, unless a small molecular ratio between formaldehyde and phenol were chosen, which would however unduly restrict the freedom of choice in the ratio and hence of the possibility of preparing certain novolaks. This is undesirable for the preparation of novolaks which are important for the industrial purposes in which, otherwise, the amount of formaldehyde used must not be such that gelatinisation would occur even in the usual discontinuous process.

Furthermore, it is to be noted that the molecular ratio is influential even if the invention is used since the number of reaction chambers over which the supply and the reaction of the formaldehyde must be divided must be matched to the ratio. Also, a division of the supply and reaction of the formaldehyde greater than that which is strictly necessary for avoiding gelatinisation may add to the quality of the novolak.

The kind of phenol is also of influence. When use is made of technical cresol containing from 50% to 55% by weight of metacresol, the risk of gelatinisation is greater than with monohydroxybenzene, and this fact must be considered by utilising a large number of portions of formaldehyde to be supplied separately.

Additional factors which are also influential in carrying out the invention are the quantity and the kind of the catalyst, the reaction temperature, the size of the reaction chambers and the rate of flow of the reaction mixture, which must be chosen to be smaller with a slower reaction in connection with the quantity and kind of the catalyst and with the reaction temperature, since it is preferable that in each reaction chamber the formaldehyde supplied thereto reacts as far as possible or at least for the greater part. In the foregoing it has already been mentioned that the reaction mixture traversing the reaction spaces must be in a sufficiently mixed state in order to avoid gelatinisation. The portion of formaldehyde supplied to each reaction space separately must intimately contact with the reaction mixture continuously flowing in the reaction space, local deposition of a condensation product phase must be avoided, and the reactive mass as a whole must be in a state of flow.

As is well-known, novolaks are, as a rule, prepared from an acid catalyst so that the invention is important more particularly for such lacquers. However, the invention may also be utilised if use is made of an alkaline catalyst, in which event the condensation reaction is slower than with the use of an acid catalyst.

The invention will now be explained by referring to the accompanying drawing in which the sole figure is a diagrammatic showing of a series of reaction chambers for preparing novolaks according to the invention.

Of reaction vessels 1 to 7, which are identical with one another, the reaction vessel 1, in which a stirrer 8 brings about the required mixing, is shown in longitudinal section. The other reaction vessels also contain a stirrer.

If necessary, heating may take place by the introduction of steam into a double bottom 22. Escaping vapours are condensed in backflow coolers 23 to 29. Supply and discharge lines for cooling water are designated 30 and 31, respectively. The reaction vessels communicate with the atmosphere through tubes 35.

Liquid phenol and a catalyst solution are caused to flow continuously from supply vessels 9 and 10 into the first reaction vessel 1 in a ratio which is controlled with the use of cocks 12 and 13. At the same time, the amount of formaline required for condensation flows continuously from the supply vessel 11 into a distribution line 32, whence the formaline is distributed over the reaction vessels 1 to 7 with the use of cocks 15 to 21, so that each of the reaction vessels receives simultaneously ⅐ of the total quantity of formaline to be supplied.

The reaction mixture continuously flows from the first reaction vessel 1 through an overflow tube 33 to the second vessel 2 and so on, so that after leaving the last reaction vessel 7 at 34, the desired final condensation product is continuously obtained. After the water has been removed, the novolak is ready for use. When the continuous process has proceeded for some time, a state of stationary condensation prevails in each reaction vessel, provided that mixing takes place intimately.

Example I

An installation of the above-described type in which each vessel had a content of 200 cc., had supplied to it in the manner described, monohydroxybenzene, formaline and a solution of sulphuric acid. The monohydroxybenzene had a content of 92.5% by weight, the formaline contained 39.6% by vol. of formaldehyde, and the solution of sulphuric acid 25% by weight of sulphuric acid. The rate of supply of the monohydroxybenzene was 6.86 mol. or 697 cc. per hour, that of the formaline was 5.83 mol. or 442 cc. per hour, and that of the sulphuric-acid solution was 144 cc. per hour. Consequently, the first reaction chamber had supplied to its $$697 + 144 + \tfrac{1}{7} \cdot 422 = 904 \text{ cc.}$$

of liquid per hour, whereas during the same period a quantity of $697+144+442=1283$ cc. per hour flowed from the last reaction chamber. Thus, the molecular ratio in which monohydroxybenzene and formaldehyde were supplied was $6.86:5.83=10:8.5$. An amount of 5.8% of the formaldehyde was left in the final reaction product so that $$\frac{94.4}{100} \times 8.5 = 8.0$$

mol. of formaldehyde per 10 mol. of monohydroxybenzene was consumed. The temperature was 98° C. in the reaction chambers containing quick-rotating stirrers. Each chamber contained 135 cc. of liquid during reaction.

The final condensation product of constant viscosity was not carried off immediately but only after lapse of time, after which a stationary reaction condition has set in in each reaction chamber and the course of the reaction condition is raised evenly in the various chambers. It is possible under similar conditions to utilise an apparatus having 5 reaction vessels without gelatinisation occurring. However, the risk of gelatinisation increases in the case of less than 5 reaction vessels.

Example II

The test installation of Example I had supplied to it in the described manner technical cresol having a content of from 50% to 55% by weight of metacresol, formaline and sulphuric acid. The technical cresol had a content of 98 g. of cresol per 100 cc. of solution, the formaline contained 39.6% by vol. of formaldehyde and the sulphuric-acid solution contained 25% by weight of sulphuric acid.

The rate of supply of the technical cresol was 419 cc. or 3.98 mols. per hour, that of the formaline was 212 cc. or 2.79 mols. per hour, and that of the sulphuric-acid solution was 144 cc. per hour.

The molecular ratio in which cresol and formaldeyhde were supplied thus was $10:6.7$.

The amount of formaldehyde left in the final reaction product was so small that analysis was not possible.

The temperature was 98° in the seven reaction chambers. In a similar test, in which six reaction vessels were used, gelatinisation occurred.

Example III

A test installation of the above-described kind having four reaction chambers had supplied to it solutions of resorcinol, formaline and caustic-soda lye. The resorcin solution had a content of 55.38 g. of resorcin per 100 cc. of solution, the formaline contained 38.5% by vol. of formaldehyde and the caustic-soda lye contained 2% by weight of sodium hydroxide.

The rate of supply of the resorcin solution was 403 cc. per hour or 2.07 mols. per hour, that of the formaline was 92.2 cc. or 1.18 mols. per hour, and that of the lye solution was 44 cc. per hour.

The molecular ratio in which resorcin and formaldehyde were supplied thus was $10:5.71$.

The amount of formaldehyde left in the final reaction product was so small that analysis was not possible.

The temperature in the reaction chambers was 98° C.

The four reaction chambers each had a content of 200 cc. The resorcin solution and the lye solution were introduced into the first vessel and formaline was introduced simultaneously into the four reaction chambers. The amounts of formaline supplied to the various chambers were substantially equal (23 cc. per hour).

If in the above-described manner use was made of three reaction chambers, gelatinisation occurred in the third vessel after approximately 4 hours.

If in the above described manner in which use was made of one reaction chamber, gelatinisation occurred within 30 minutes.

While I have thus described my invention with specific examples and applications, other modifications thereof will appear obvious to those skilled in the art without departing from the spirit and scope of the invention.

What we claim is:

1. A continuous process for preparing novolaks as claimed in claim 8 in which a stationary reaction condition prevails in each of the said reaction chambers.

2. A continuous process for preparing novolaks as claimed in claim 8 in which the reaction mixture in each of the said reaction chambers is continuously stirred.

3. A continuous process for preparing novolaks as claimed in claim 8 in which the reaction mixture in each chamber is heated to a temperature of about 98° C.

4. A continuous process for preparing novolaks as claimed in claim 8 in which the phenol is monohydroxybenzene.

5. A continuous process for preparing novolaks as claimed in claim 8 in which the phenol is metacresol.

6. A continuous process for preparing novolaks as claimed in claim 8 in which the phenol is resorcin.

7. A continuous process for preparing novolaks as claimed in claim 8 in which the catalyser is an acid catalyst.

8. A continuous process for preparing novolaks of the phenol-formaldehyde condensation product type comprising the steps of continuously introducing into a first reaction vessel a phenol selected from the group consisting of monohydroxybenzene, cresol, xylenol and resorcinol, a catalyst, and formaldehyde in an amount less than that required to completely react the phenol to phenol-formaldehyde and sufficient to maintain a stationary reaction condition in said first vessel, continuously withdrawing from the first reaction vessel a stream equal in volume to the streams of the reaction components entering the first reaction vessel, continuously introducing into a second reaction vessel the stream being withdrawn from the first reaction vessel, introducing a stream of formaldehyde into said second vessel in an amount sufficient to continue the reaction of the phenol without gelatinizing the reaction mixture, and successively repeating the steps of continuously introducing reaction mixture, adding a quantity of formaldehyde to the reaction mixture to continue the reaction without gelatinization and withdrawing an amount equal in volume to that introduced in succeeding reaction vessels until the reaction is completed.

9. A continuous process for preparing novolaks as claimed in claim 8 in which the quantities of formaldehyde introduced into the first, second and succeeding reaction vessels are substantially equal.

HERMAN BLOEM.
MARINUS STEL.

References Cited in the file of this patent

UNITED STATES PATENTS

| Number | Name | Date |
|---|---|---|
| 2,090,586 | Ward | Aug. 17, 1937 |
| 2,151,946 | Symonds | Mar. 28, 1939 |
| 2,154,541 | Sutherland | Apr. 18, 1939 |
| 2,233,956 | Moore | Mar. 4, 1941 |
| 2,240,618 | Harris | May 6, 1941 |
| 2,317,878 | Bannon | Apr. 27, 1943 |
| 2,419,275 | Metzger | Apr. 22, 1947 |
| 2,456,192 | Houlton | Dec. 14, 1948 |
| 2,475,016 | De Nie | July 5, 1949 |
| 2,548,003 | Davidson | Apr. 10, 1951 |